(12) United States Patent
Thonnart (10) Patent No.: US 9,479,256 B2
(45) Date of Patent: Oct. 25, 2016

(54) OPTICAL NETWORK AND DATA PROCESSING SYSTEM COMPRISING SUCH AN OPTICAL NETWORK

(71) Applicant: COMMISSARIAT A L'ENERGIE ATOMIQUE ET AUX ENE ALT, Paris (FR)

(72) Inventor: Yvain Thonnart, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/547,511

(22) Filed: Nov. 19, 2014

(65) Prior Publication Data

US 2015/0139646 A1 May 21, 2015

(30) Foreign Application Priority Data

Nov. 19, 2013 (FR) ...................... 13 61349

(51) Int. Cl.
*H04B 10/27* (2013.01)
*G02B 6/43* (2006.01)
*H04B 10/80* (2013.01)

(52) U.S. Cl.
CPC ................ *H04B 10/27* (2013.01); *G02B 6/43* (2013.01); *H04B 10/801* (2013.01)

(58) Field of Classification Search
CPC ....... H04B 10/27; H04B 10/278; G02B 6/43
See application file for complete search history.

(56) References Cited

U.S. PATENT DOCUMENTS 5,742,585 A * 4/1998 Yamamoto .......... H04J 14/0204
370/223
6,714,550 B1 * 3/2004 Yamamoto .......... H04L 49/3018
370/400

(Continued)

FOREIGN PATENT DOCUMENTS

WO WO 2009/154592 A1 12/2009

OTHER PUBLICATIONS

French Preliminary Search Report issued Jul. 18, 2014 in French Application 13 61349, filed on Nov. 19, 2013 ( with English Translation of Categories of Cited Documents).

(Continued)

*Primary Examiner* — David Payne
*Assistant Examiner* — Casey Kretzer
(74) *Attorney, Agent, or Firm* — Oblon, McClelland, Maier & Neustadt, L.L.P.

(57) ABSTRACT

An optical network including: a medium; at least one beam of optical waveguides extending over the medium; for each beam, interfaces between the beam and the processing units, respectively. The beam successively links the interfaces in a closed loop oriented in a certain direction of rotation of information. The communication units of each interface are transversely arranged in ranks increasing from the periphery to the interior of the beam. First and second optical waveguides start from different interfaces or end at different interfaces. The first optical waveguide links two communication units both of them readers and/or writers of different ranks in first and second respective interfaces. The second optical waveguide passes through a communication unit from the second interface of lower rank to that of the communication unit of said second interface through which the first optical waveguide passes.

17 Claims, 8 Drawing Sheets

(56) References Cited

U.S. PATENT DOCUMENTS

2011/0097086 A1* 4/2011 Binkert .............. G02B 6/12007
                                                     398/71
2013/0251378 A1* 9/2013 Ahn ................. H04B 10/25756
                                                    398/141

OTHER PUBLICATIONS

Sebastien Le Beux et al. "Optical Ring Network-on-Chip (ORNoC): Architecture and Design Methodology", Design, Automation & Test in Europe, 2011, 6 pages.

Pradheep Khanna Kaliraj et al. "Performance Evaluation of Reliability Aware Photonic Network-on-Chip Architectures", Green Computing Conference, 2012, 6 pages.

Yu-Hsiang Kao et al. "BLOCON: A Bufferless Photonic Clos Network-on-Chip Architecture", Networks on Chip, 2011, 8 pages.

Pratiksha Gehlot et al. "Performance Evaluation of Network on Chip Architectures", 2009 International Conference on Emerging Trends in Electronic and Photonic Devices & Systems, 2009, 4 pages.

* cited by examiner

Fig.13

OPTICAL NETWORK AND DATA PROCESSING SYSTEM COMPRISING SUCH AN OPTICAL NETWORK

This invention relates to an optical network and a data processing system comprising such an optical network.

BACKGROUND OF THE INVENTION

The invention applies more specifically to an optical network intended to enable data communication between data processing units, comprising:
- a medium,
  - at least one beam of at least one optical waveguide extending over the medium,
  - for each beam, interfaces between the beam and the processing units, respectively, each interface comprising one or more units for communication with, respectively, one or more optical waveguides of the beam to enable the respective processing unit to exchange data with said optical waveguide(s), each communication unit being capable of being a reader and/or a writer,
wherein the beam successively links the interfaces in a closed loop oriented in a certain direction of rotation, and wherein the communication units of each interface are transversely arranged in ranks increasing from the periphery to the interior of the beam.

DESCRIPTION OF THE PRIOR ART

The article entitled "Photonic Networks-on-Chip for Future Generations of Chip Multiprocessors", of A. SHACHAM, K. BERGMAN, L. P. CARLONI, published in IEEE TRANSACTIONS ON COMPUTERS, volume 57, n° 9, in September 2008, describes an optical network comprising optical waveguides linking interfaces according to a two-dimensional mesh topology in which the data first follows a horizontal path then a vertical path to the reader thereof. The injection, the change in direction and the ejection via optical routers are configured by an electrical slave network.

This solution has a number of disadvantages. First, the large number of optical waveguide crossings generates significant losses on the optical signal transferred, which must be compensated for by an increase in the power of the laser supplying the optical waveguides, and therefore the consumption of the system. Moreover, the need for a slave network to control the optical routers involves electrical control logic distributed over the entire topology, which occupies a certain surface and may lead to significant configuration latencies.

The article entitled "Multi-Optical Network-on-Chip for Large Scale MPSoC", of S. LE BEUX, I. O'CONNOR et al., published in IEEE EMBEDDED SYSTEMS LETTERS, volume 2, n° 3, in September 2010, describes a "Banyan" optical network comprising optical waveguides linking writers with readers across routers. The routers divert a specific wavelength while allowing the other wavelengths to pass in the same axis. To define a path between a writer and a reader, a connectivity matrix determines the wavelength to be selected by each writer in order to communicate with a given reader.

This solution also has a number of disadvantages. The static wavelength routers do not require dynamic configuration logic, but must be maintained in resonance on their specific wavelength, which may require control logic on the entire topology (for example, in the case of router temperature dependence). In addition, this solution also has a non-negligible number of optical waveguide crossings.

The article entitled "Optical Ring Network-on-Chip (OR-NoC): Architecture and design methodology", of S. LE BEUX, I. O'CONNOR et al., published in 2011, describes an optical network including, in an optical waveguide, a light beam having a plurality of wavelengths. Each wavelength is a communication channel linking a single writer with a single reader. The optical waveguide is circular, with the light beam passing in a closed loop through interfaces.

This solution, however, has a number of disadvantages. It first requires a large number of channels in the optical waveguide, or even the use of a plurality of multichannel optical waveguides, to ensure the complete connectivity of all of the writers with all of the readers, which involves interface surface and complexity costs. Moreover, each interface capable of being a writer must have at least one laser source, which is particularly cumbersome.

The article entitled "Corona: System Implications of Emerging Nanophotonic Technology", of D. VANTREASE, R. G. BEAUSOLEIL et al., published by ISCA in June 2008, and the article entitled "Firefly: Illuminating future network-on-chip with nanophotonics", of Y. PAN et al., published by ISCA in 2009, each describe an optical network substantially similar to that of the article of LE BEUX et al, except that each optical waveguide links a plurality of writers to a single reader, or a single writer to a plurality of readers.

This solution has the disadvantage of requiring different interfaces.

It may thus be desirable to provide an optical network that makes it possible to overcome at least some of the aforementioned problems and constraints.

SUMMARY OF THE INVENTION

An optical network intended to enable communication of data between data processing units is therefore proposed, which comprises:
  a medium,
  at least one beam of a plurality of optical waveguides extending over the medium,
  for each beam, interfaces between the beam and the processing units, respectively, each interface comprising one or more communication units with, respectively, one or more optical waveguides of the beam in order to enable the respective processing unit to exchange data with said optical waveguide(s), each communication unit being capable of being a reader and/or a writer,
wherein the beam successively links the interfaces in a closed loop oriented in a certain direction of rotation of information,
wherein the communication units of each interface are transversely arranged in ranks increasing from the periphery to the interior of the beam,
wherein the first and second optical waveguides start from different interfaces or end at different interfaces,
wherein the first optical waveguide links two communication units, both readers and/or writers of different ranks in first and second respective interfaces,
and wherein the second optical waveguide passes through a communication unit of the second interface of lower rank than that of the communication unit of said second interface through which the first optical waveguide passes.

Thus, the communication units linked by a single optical waveguide are no longer necessarily in the same rank and it is possible to choose this rank according to the interfaces desired. In particular, it is possible to obtain homogeneous interfaces, which is useful when the processing units are identical. In addition, it is possible to limit crossings of optical waveguides.

Optionally, for each beam, at least two interfaces comprise the same number of writers and readers, transversely arranged in the same manner, and the writers are all placed at the periphery of the beam and the readers are placed at the interior of the beam, or the reverse.

Also optionally, each of said plurality of optical waveguides of the beam starts or ends: either from/at the most peripheral communication unit of one of the interfaces with the beam, or from/at another communication unit of the interface, at the periphery of which are only communication units from/at which, respectively, other optical waveguides start or end.

Also optionally, each of at least one optical waveguide links, in the direction of rotation of information, communication units arranged increasingly close to the interior of the beam in their respective interfaces, or arranged increasingly close to the periphery of the beam in their respective interfaces.

Also optionally, each of said plurality of optical waveguides ends or starts: either at/from the interior-most communication unit of one of the interfaces, or at/from another communication unit of the interface, at the interior of which are only communication units where, respectively, other optical waveguides end or start.

Also optionally, the optical waveguides of each beam extend over the medium in the form of a spiral, each of the optical waveguides forming an arm of the spiral.

Also optionally, at least one optical waveguide passes successively through a communication unit of each of the interfaces, the communication units all being readers except for the first, which is a writer.

Also optionally, at least one optical waveguide links a single writer to a single reader.

Also optionally, the network further comprises, for at least one optical waveguide, an optical source extending over the medium, this optical source being specific to said optical waveguide and linked to a starting end of the optical waveguide.

Also optionally, the network comprises an input on the medium intended to be linked to an optical source outside the optical network, said input being linked to the starting end of at least one optical waveguide.

Also optionally, the network comprises two beams nested one in the other.

Also optionally, the optical waveguides of the same beam do not cross.

A data processing system is also proposed, comprising:
data processing units,
an optical network according to the invention intended to enable communication of data between the data processing units.

BRIEF DESCRIPTION OF THE DRAWINGS

The invention will be easier to understand in view of the following description, provided solely as an example and with reference to the appended drawings, wherein:

FIG. 1 schematically shows the general structure of an optical network according to the invention, FIG. 2 schematically shows an interface of the optical network of FIG. 1, FIG. 3 schematically shows a communication unit of the interface of FIG. 2, linked to a processing unit, FIGS. 4 to 13 schematically show optical networks according to different embodiments of the invention.

DESCRIPTION OF THE PREFERRED EMBODIMENTS

In reference to FIG. 1, the general structure of an optical network 100 according to the invention will now be described.

The network 100 is intended to enable communication of data between data processing units (not shown in FIG. 1), the quantity of which is M. The number M may range from two to more than one hundred, or even more than one thousand. The processing units are, for example, integrated circuits, also called "chips".

To this effect, the network 100 comprises, first, a medium 102 in the form of a plate and a beam F of at least one optical waveguide extending over the medium 102.

The network 100 also comprises, for each processing unit, an interface $I_m$ (m ranging from 1 to M) between the beam F and the processing unit. The interface $I_m$, is intended to enable the processing unit to exchange data with the waveguide(s) interfaced. Generally, the processing unit is intended to go over the interface and to cover it. However, in some cases, the interface may extend over the medium 102 beyond the limits of the processing unit. Alternatively, the processing units may also be borne by the medium 102.

As is visible in FIG. 1, the beam F successively links the interfaces $I_m$ in a closed loop in a certain direction of rotation R intended to correspond, as will be explained below, to the direction of propagation of light in the optical waveguide(s) of the beam F. In the example described, the direction of rotation R is clockwise.

Each waveguide of the beam F is an elongate element intended to guide light in order to propagate information. Preferably, as will be explained below, each waveguide is supplied with light so that the light is propagated in the direction of rotation R, which is therefore also the direction of propagation of the information. Each waveguide extends over at least one portion of the closed loop formed by the beam F. When the beam F combines a plurality of waveguides, the portions over which the waveguides extend overlap in order to close the loop. Optionally, one or more waveguides may extend over more than one rotation of the closed loop. No waveguide crosses itself or the other waveguides of the beam F. The waveguides of the beam F extend substantially parallel to one another.

In the description below, each waveguide will be designated by the general reference $G_k$, with k being an index specific to said waveguide. Generally, each waveguide has a width of less than 10 μm.

In reference to FIG. 2, the general structure of an interface $I_m$ with optical waveguides $G_{k(n)}$ (n ranging from 1 to N, N being the number of optical waveguides interfaced) of the beam F will now be described.

The interface $I_m$ comprises, for each waveguide $G_{k(n)}$ interfaced, a communication unit $C_{mn}$ with the waveguide $G_{k(n)}$ interfaced. Each communication unit $C_{mn}$ may be a reader intended to enable the processing unit to read data from the optical waveguide $G_{k(n)}$ and/or a writer intended to enable the processing unit to transmit data in the waveguide $G_{k(n)}$.

Figures 1, 2, 3:
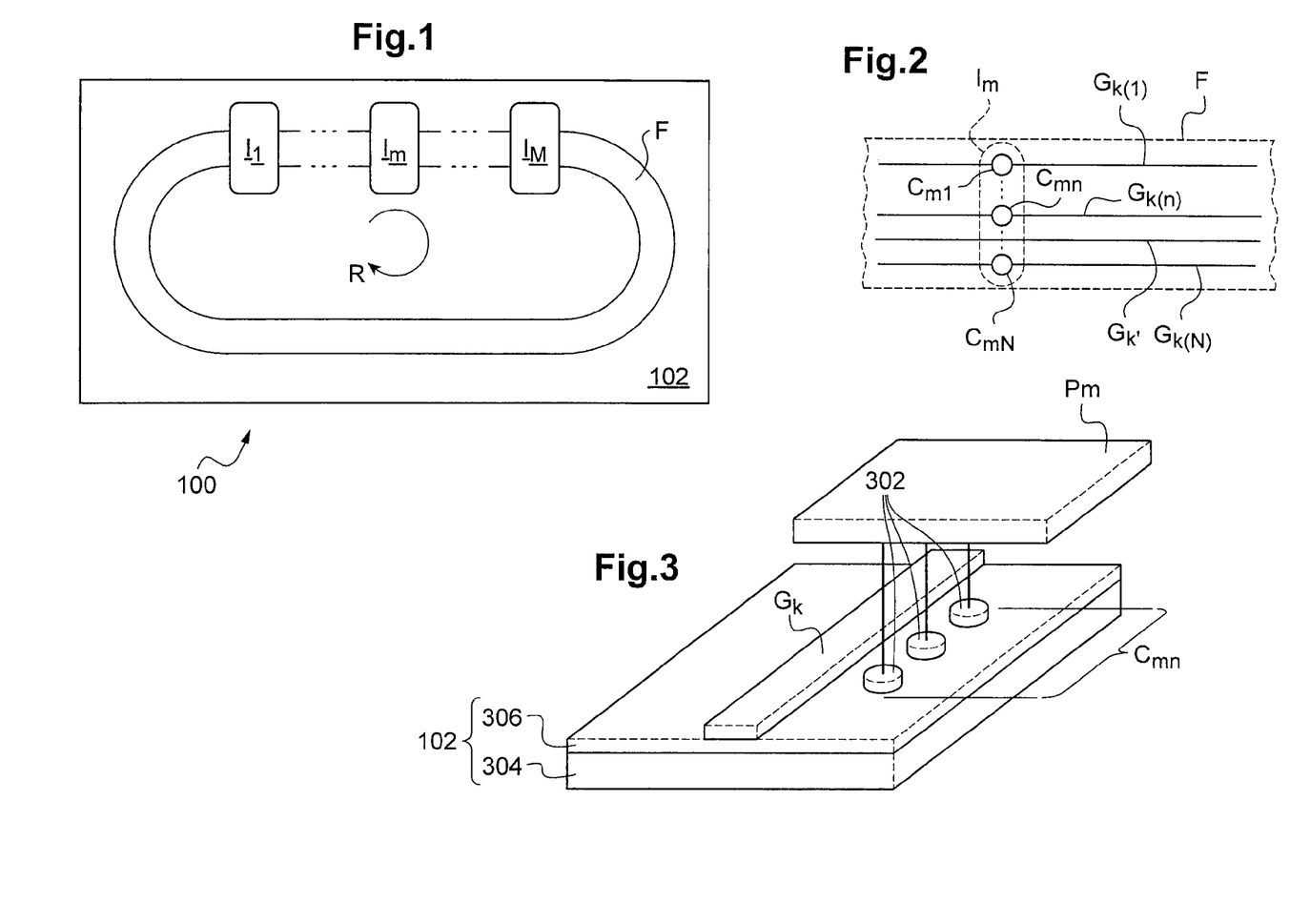

As can be seen in FIG. 2, the communication units $C_{mn}$ of the interface $I_m$ are transversely arranged in ranks n increasing from the periphery to the interior of the beam F. N is also the number of communication units of the interface $I_m$ and can be different from one interface to another. In the example shown in FIG. 2, the communication units $C_{m1}$ to $C_{mN}$ are in communication with the waveguides $G_{k(1)}$ to $G_{k(N)}$, respectively.

It should also be noted that waveguides $G_{k'}$ of the beam F may pass in the vicinity of an interface $I_m$ without being interfaced, i.e. without the interface $I_m$ comprising a communication unit with these waveguides $G_{k'}$.

In general, each optical waveguide $G_k$ of the beam F starts from a starting communication unit and ends at an end communication unit, passing, as the case may be, successively through one or more other intermediate communication units. Along the waveguide, each intermediate and end communication unit belongs to a different interface from that of the preceding communication unit.

In reference to FIG. 3, a communication unit $C_{mn}$ belonging to the interface $I_m$ of a processing unit $P_m$ will now be described.

The processing unit $P_m$ extends over the communication unit $C_{mn}$. The communication unit $C_{mn}$ comprises at least one communication device 302 linked to the processing unit $P_m$. When the communication unit $C_{mn}$ is a writer, at least one communication device 302 is a writing device intended to modulate the light traveling along the optical waveguide $G_k$ in order to transmit data. When the communication unit $C_{mn}$ is a reader, at least one communication device 302 is a reading device sensitive to light modulation in order to read the data. The presence of a plurality of communication devices 302 makes it possible to configure them in order to operate on different communication channels. Different multiplexing strategies are possible: temporal, wavelength, frequency, code, etc.

In addition, as can be seen in FIG. 3, when the optical network is produced by means of "silicon photonics" technology, the support 102 may include a silicon layer 304 covered with a silica dioxide layer 306. In this technology, each optical waveguide $G_k$ comprises a silicon band extending over the silica dioxide layer 306. In addition, each communication device 302 comprises, for example, a ring modulator, associated with a photodiode in the case of data reading.

However, the invention is not limited to silicon photonics technology, but may be applied to any other technology enabling optical networks to be produced. For example, an optical network according to the invention may be obtained with optical card technology, in which the medium is made of an FR-4 (flame resistant 4) substrate, and in which the optical waveguides are made of polymer.

In reference to FIG. 4, an optical network 4 according to an embodiment of the invention will now be described. The network 4 includes the elements described in reference to FIGS. 1 to 3.

The network 4 comprises four interfaces $I_m$ (m=1 ... 4) of four processing units $P_m$, respectively. The network 4 further comprises a beam F of four optical waveguides $G_k$ (k=1 ... 4) successively linking the interfaces $I_m$ in a closed loop in a direction of rotation R.

Each interface $I_m$ comprises four communication units $C_{mn}$ (n=1 ... 4) each comprising four communication devices represented by circles.

Figure 4:
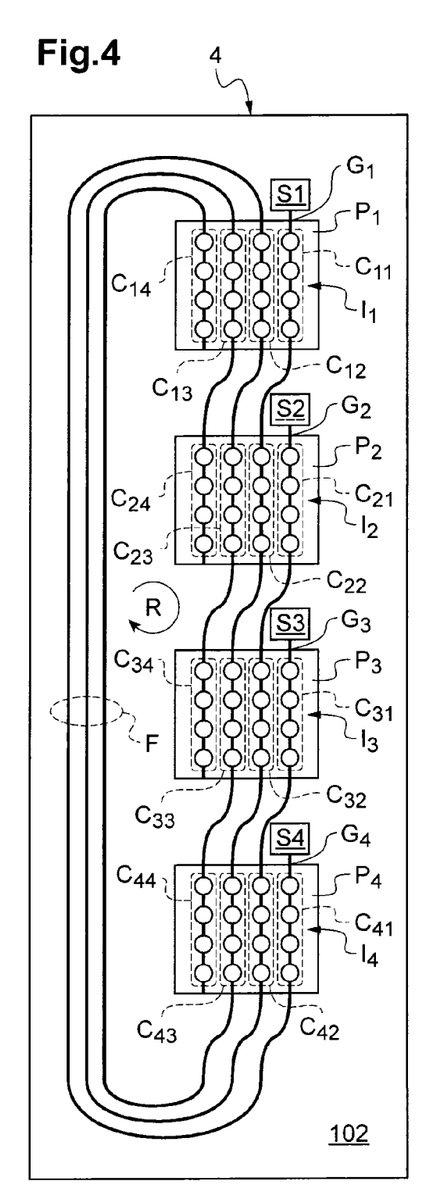

As can be seen in FIG. 4, each waveguide $G_k$ of the beam F starts from the periphery and arrives at the interior of the beam F, passing successively through a communication unit $C_{mn}$ of each of the interfaces $I_m$.

In this manner, the end communication unit of each waveguide $G_k$ belongs to the interface farthest, in the direction of rotation R, from the starting interface of the optical waveguide $G_k$. This farthest interface is also the interface preceding the starting interface. As the optical waveguides $G_k$ begin with different starting interfaces and also end with different ending interfaces, the beam F is in a closed loop, as can be seen in FIG. 4.

In addition, a waveguide $G_k$ is introduced at each interface $I_m$ at the periphery of the beam F, so that the waveguide $G_k$ starts from the communication unit $C_{mn}$ of the most peripheral interface $I_m$, i.e. of rank 1. The introduction of each waveguide $G_k$ interiorly offsets the waveguides introduced at preceding interfaces. This offset makes it possible to obtain homogeneous interfaces $I_m$, i.e. that have the same number of writers and readers arranged transversely in the same manner. This aspect of the invention is seen, for example, in the next FIGS. 6 and 7. Moreover, the communication units $C_{mn}$ have ranks increasing along the optical waveguide $G_k$, i.e. they are arranged increasingly close to the interior of the beam F in their respective interfaces. In the example described, the ranks increase by one, from one communication unit $C_{mn}$ to the next along the optical waveguide $G_k$. Furthermore, the end communication unit of each waveguide $G_k$ is the interior-most of the beam F. Thus, the waveguides $G_k$ extend over the medium 102 in the form of a spiral (as in spiral galaxies of stars), each optical waveguide forming an arm of the spiral.

For example, the optical waveguide G1 is introduced at the interface $I_1$ and passes through the following communication units: $C_{11}$ (rank 1 of interface $I_1$), $C_{22}$ (rank 2 of interface $I_2$), $C_{33}$ (rank 3 of interface $I_3$) and $C_{44}$ (rank 4 of interface $I_4$).

Thus, the beam F ensures a complete connection of the interfaces $I_m$, i.e. it is possible from each interface $I_m$ to transmit data to any of the other interfaces.

In addition, the network 4 comprises four optical sources $S_k$, for example lasers, on board the medium 102 of the network 4. The sources $S_k$ are respectively linked to the starting ends of the four waveguides $G_k$, i.e. respectively at the starting communication units. Thus, each waveguide $G_k$ is linked to an optical source $S_m$ specific to it. In one embodiment, each optical source $S_m$ may produce a direct modulation, and therefore replaces the starting communication unit of each waveguide $G_k$.

The fact that the ends of the waveguides $G_k$ are at the periphery and at the interior of the beam F has the advantage of facilitating the optical power distribution and/or the interface production processes.

Figure 5:
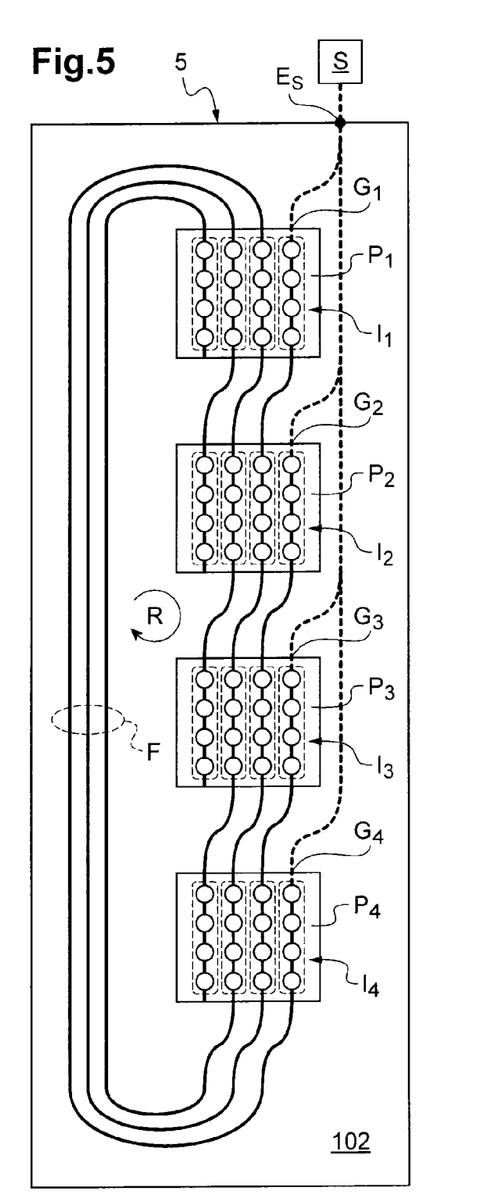

In reference to FIG. 5, an optical network 5 according to another embodiment of the invention will now be described.

Network 5 is similar to that of FIG. 4, and therefore the elements in common in FIG. 4 will not be described again.

In network 5, the optical sources $S_k$ are replaced by a single optical source S. More specifically, the network 5 comprises an input $E_S$ on the medium 102 linked to the optical source S, which is outside the network 5. The source S is, for example, a laser, for example intended to provide a plurality of wavelengths. The input $E_S$ is linked to all of the starting ends of the optical waveguides $G_k$ by optical power waveguides represented as dotted lines. This connection to the optical source S is largely facilitated by the fact that the optical waveguides $G_k$ start from the periphery of the beam F.

Although the connections with the optical waveguides are represented as dotted lines, it should be noted that these connections and the optical waveguides are generally produced with physical continuity, the assembly forming a tree structure extending over the medium 102. Thus, each optical waveguide is a branch segment of said tree structure.

Figure 6:
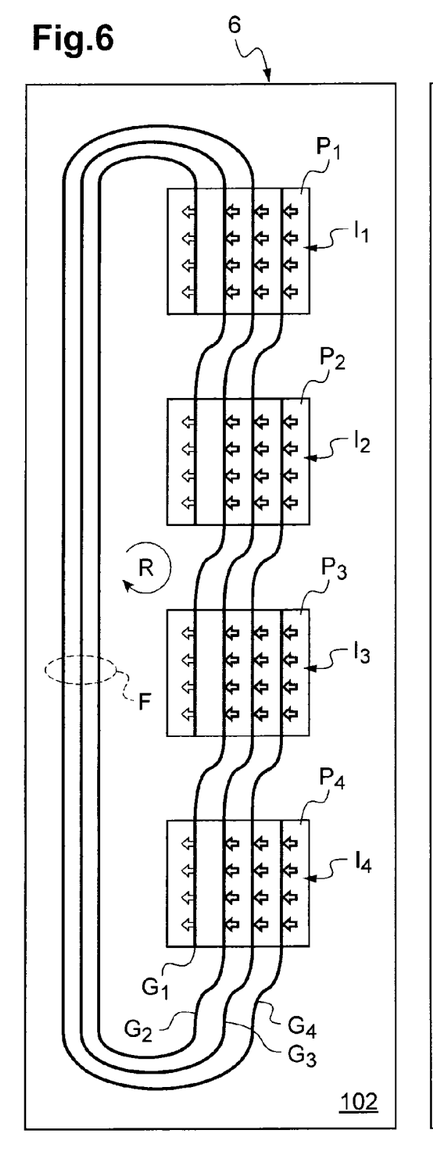

In reference to FIG. 6, an optical network 6 according to another embodiment of the invention will now be described.

Network 6 is similar to that of FIG. 4, and therefore the elements in common in FIG. 4 will not be described again.

In network 6, each waveguide $G_k$ is of the MWSR (Multiple Writer/Single Reader) type. In this case, all of the communication units $C_{mn}$ of each waveguide $G_k$ are writers except for the last, which is a reader. This in particular means that each communication device of each writer $C_{m1} \ldots C_{m3}$ is a reading device, shown in FIG. 6 (and following) by an arrow pointing to the optical waveguide $G_k$, and that each communication device of each reader $C_{m4}$ is a reading device, shown in FIG. 6 (and following) by an arrow pointing away from the optical waveguide $G_k$.

It should be noted that the strategic topology of the waveguides $G_k$ makes it possible to obtain homogeneous interfaces $I_m$, i.e. all having the same number of writers and readers, transversely arranged in the same manner for all of the interfaces $I_m$.

Figure 7:
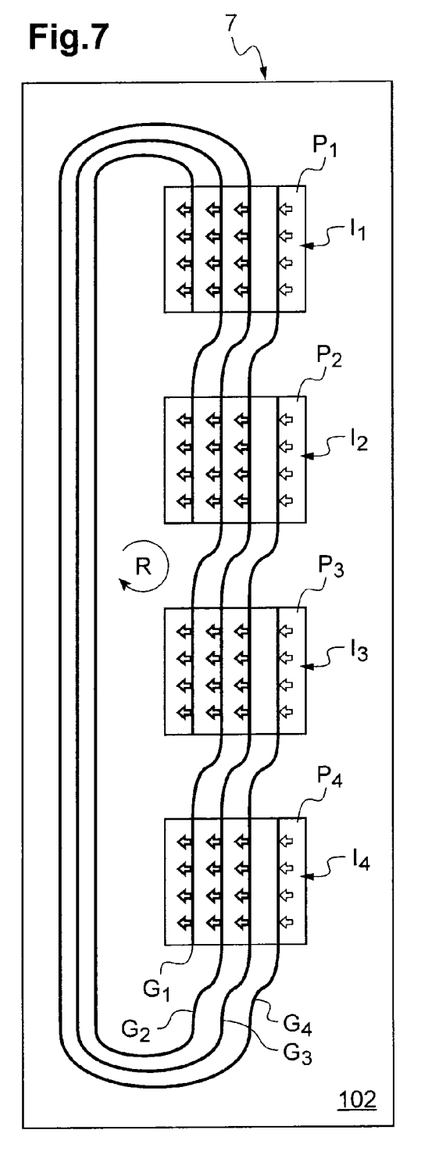

In reference to FIG. 7, an optical network 7 according to another embodiment of the invention will now be described.

Network 7 is similar to that of FIG. 4, and therefore the elements in common in FIG. 4 will not be described again.

In network 7, each waveguide $G_k$ is of the SWMR (Single Writer/Multiple Reader) type. To this effect, all of the communication units $C_{mn}$ of each waveguide $G_k$ are readers except for the first, which is a writer.

It should be noted that, again, all of the interfaces $I_m$ are homogeneous.

In reference to FIG. 8, an optical network 8 according to another embodiment of the invention will now be described.

Network 8 is similar to that of FIG. 4, and therefore the elements in common in FIG. 4 will not be described again.

In network 8, the waveguides $G_k$ are introduced at each interface $I_m$ in pairs, as will be explained.

Network 8 comprises four interfaces $I_m$ (m=1 . . . 4) of four processing units $P_m$, respectively. Network 8 further comprises a beam F of eight optical waveguides $G_k$ (k=1 . . . 8) successively linking the interfaces $I_m$ in a closed loop according to a direction of rotation R.

Each interface $I_m$ comprises eight communication units $G_{mn}$ (n=1 . . . 8) each comprising four communication devices represented by circles.

Figure 8:
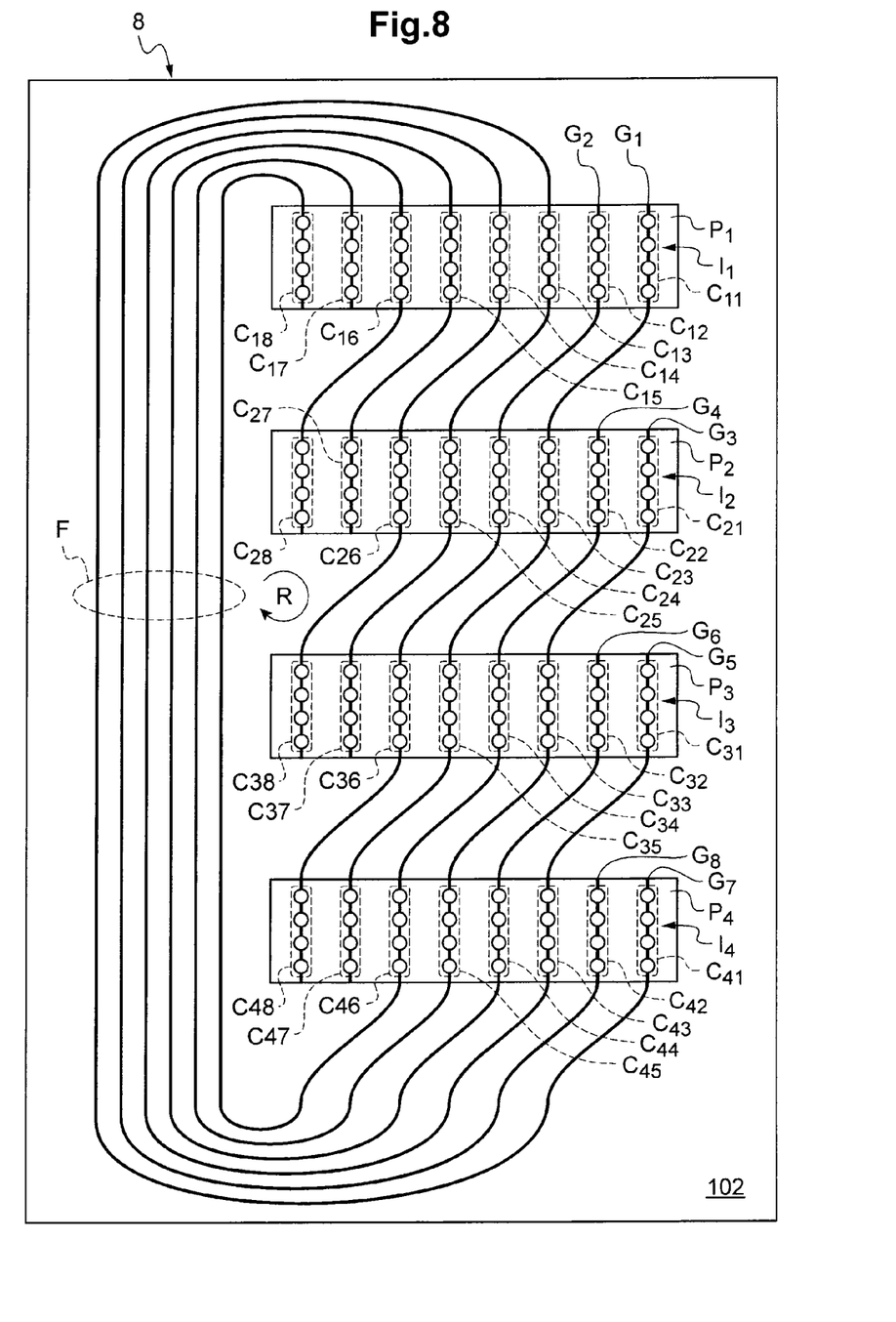

As can be seen in FIG. 8, each waveguide $G_k$ of the beam F starts from the periphery and arrives at the interior of the beam F, passing successively through a communication unit $C_{mn}$ of each of the interfaces $I_m$. In this way, the last communication unit of each optical waveguide $G_k$ belongs to the interface farthest, in the direction of rotation R, from the starting interface of the waveguide $G_k$.

In addition, a pair of new waveguides $G_k$ is introduced at each interface $I_m$ at the periphery of the beam F, so that said two waveguides start, respectively, from the two most peripheral communication units $C_{mn}$ of the interface $I_m$, i.e. of ranks 1 and 2. The introduction of each pair of waveguides $G_k$ interiorly offsets the waveguides $G_k$ introduced at preceding interfaces. Moreover, the communication units $C_{mn}$ have ranks increasing along the waveguide $G_k$. In the example described, the ranks increase by two, from one communication unit $C_{mn}$ to the next along the waveguide $G_k$. Furthermore, the end communication unit of each waveguide $G_k$ is the interior-most of the beam F.

For example, the waveguides of the pair $G_1$, $G_2$ pass respectively through the following communication units: $C_{11}$, $C_{12}$ (ranks 1 and 2 of interface $I_1$), $C_{23}$, $C_{24}$ (ranks 3 and 4 of interface $I_2$), $C_{35}$, $C_{36}$ (ranks 5 and 6 of interface $I_3$) and $C_{47}$, $C_{48}$ (ranks 7 and 8 of interface $I_4$).

The grouping of waveguides in pairs may be useful in order to separate different types of data. For example, one waveguide of the pair may be used to transmit a request, and the other waveguide of the pair may be used to transmit a response to a request, which makes it possible to obtain a regular request-response architecture. As can be seen in FIG. 8, the waveguides dedicated to requests and the waveguides dedicated to responses alternate transversely with respect to the beam F.

Figure 9:
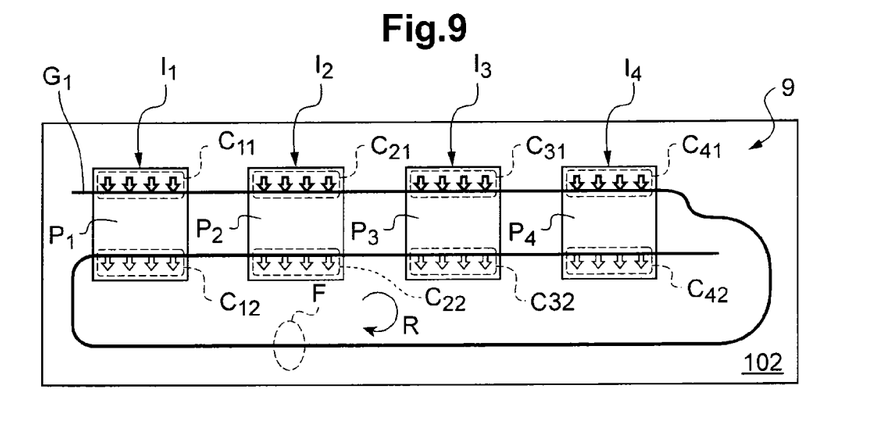

In reference to FIG. 9, an optical network 9 including a single optical waveguide will now be described. The network 9 includes elements described in reference to FIGS. 1 to 3.

Network 9 comprises four interfaces $I_m$ (m=1 . . . 4) of four processing units $P_m$, respectively. Network 9 further comprises a beam F consisting of a single optical waveguide G, successively linking the interfaces $I_m$ in a closed loop according to a direction of rotation R.

In network 9, the waveguide $G_1$ is of the MWMR (Multiple Writer/Multiple Reader) type. To this effect, each interface $I_m$ comprises a reader $C_{m2}$ and a writer $C_{m1}$ located in the interface $I_m$ at the periphery of the reader $C_{m2}$. The waveguide $G_1$ passes, in the direction of rotation R, through all of the writers $C_{m1}$ of the interfaces $I_m$, then returns to the first interface $I_1$ and passes through all of the readers $C_{m2}$ of the interfaces $I_m$. In particular, the optical waveguide $G_1$ passes through a communication unit of rank one (communication unit $C_{41}$) through a communication unit of rank two (communication unit $C_{12}$).

Figure 10:
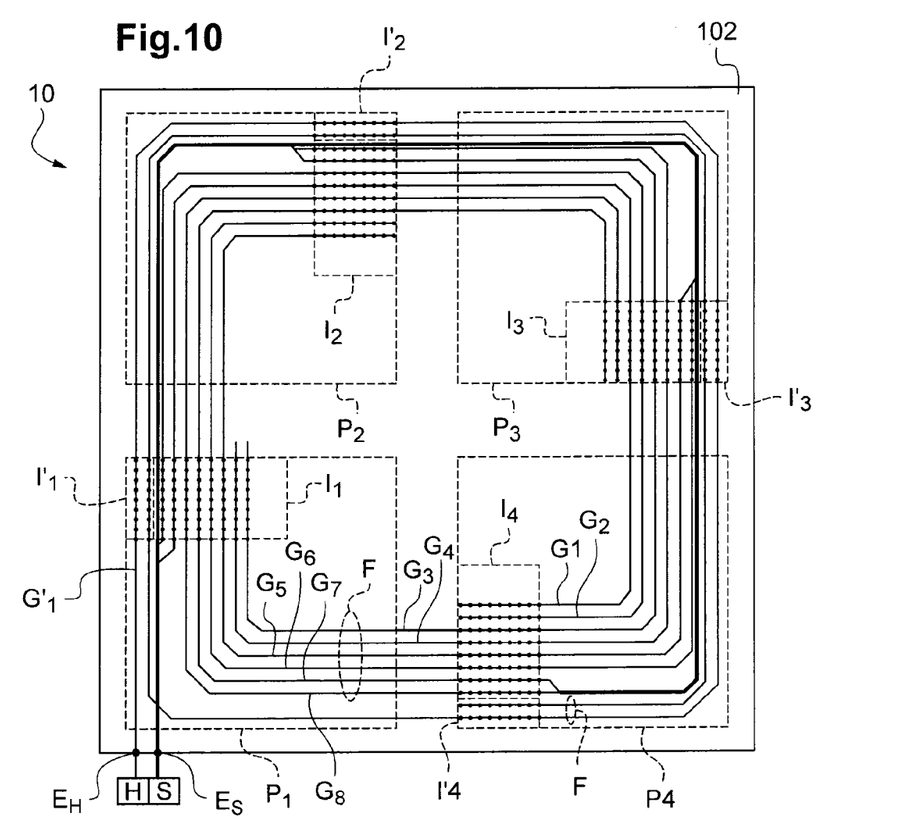

In reference to FIG. 10, an optical network 10 according to another embodiment of the invention will now be described.

Network 10 is similar to that of FIG. 8, and therefore the elements in common with FIG. 8 will not be described again.

In network 10, each communication unit $C_{mn}$ comprises eight communication devices instead of four for network 8.

In addition, network 10 comprises four interfaces $I'_m$ for the four processing units $P_m$, respectively. The four interfaces $I'_m$ are respectively located at the periphery of the four interfaces $I_m$ and each comprises two communication units each comprising eight communication devices represented by circles.

The network 10 further comprises another beam F' surrounding beam F and comprising a single optical waveguide G', successively linking the interfaces $I'_m$ in a closed loop in the same direction of rotation R as beam F. Beam F' surrounds the beam F.

As can be seen in FIG. 4, each interface $I'_m$ comprises two communication units $C'_{m1}$, $C'_{m2}$ for communicating with the waveguide $G'_1$. These two communication units $C'_{m1}$, $C'_{m2}$ are arranged, respectively, at the periphery and at the interior of the beam F'. The waveguide $G'_1$ passes, in the direction of rotation R, through all of the peripheral communication units $C'_{m1}$, then returns to the first interface and passes through all of the interior communication units $C'_{m2}$.

The network 10 further comprises an input $E_H$ on the medium 102 linked to a clock source H outside the network 10. The input $E_H$ is linked to the starting end of the waveguide G'1.

In addition, the network 10 comprises an input $E_S$ on the medium 102 linked to an optical source S outside the network 10, for example a laser. The input $E_S$ is linked to the starting ends of the waveguides $G_k$ by power optical waveguides represented with thick lines.

It should be noted that the network 10 comprises only a single crossing of optical waveguides, between the power waveguide and waveguide $G'_1$.

The network 10 is a good example of a case in which information of different types must be exchanged between the interfaces (clock information and data information). In this case, the invention advantageously makes it possible to use a different beam for each type of information, the different beams extending one around another concentrically, even if it produces some crossings between waveguides of different beams.

In addition, the fact that the clock signal is propagated in the same direction of rotation R as the data in the waveguides $G_k$ makes it possible to facilitate the synchronization of processing units $P_m$.

In reference to FIG. 11, an optical network 11 according to another embodiment of the invention will now be described.

Network 11 is similar to that of FIG. 8, and therefore the elements in common in FIG. 8 will not be described again.

Figure 11:
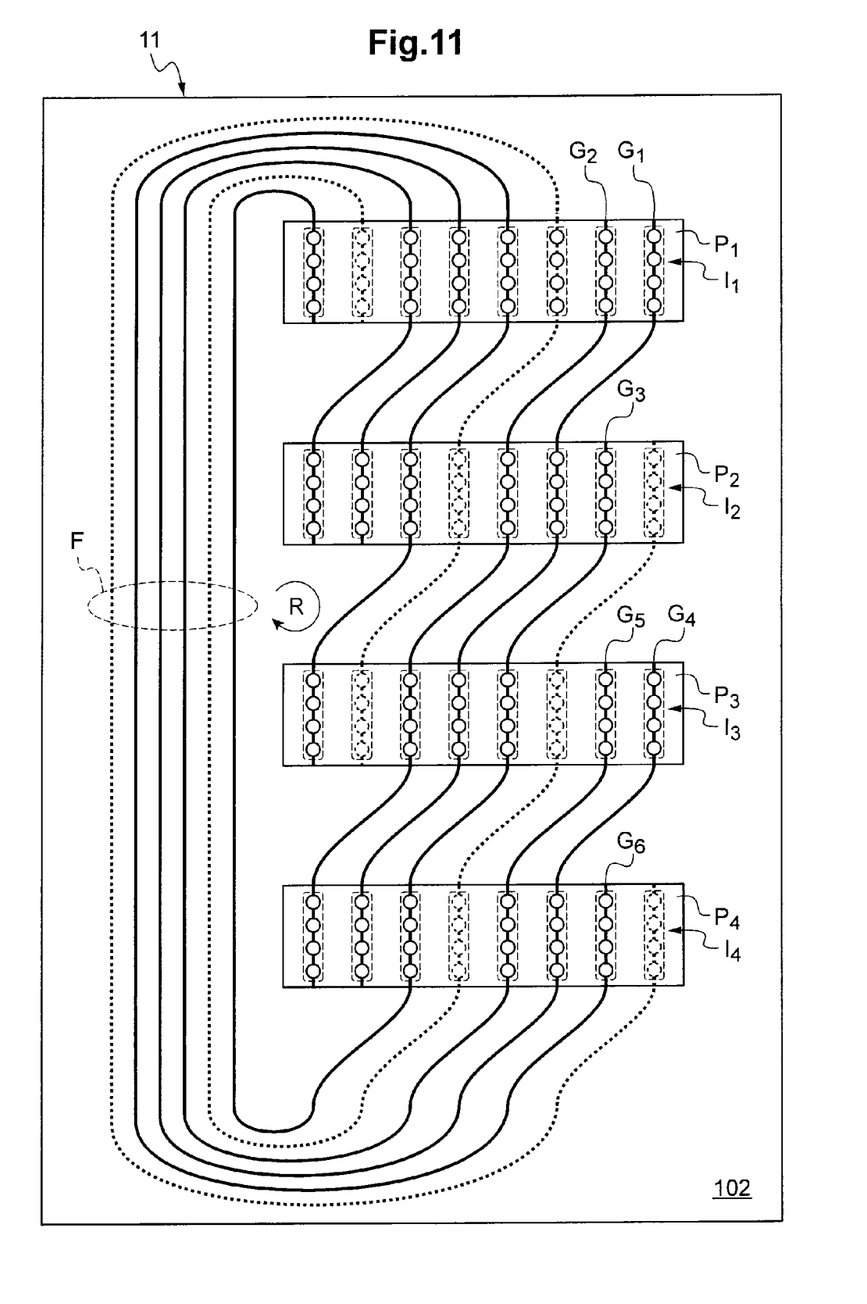

As can be seen in FIG. 11, network 11 is designed on the basis of network 8 of FIG. 8. It is in fact enough to remove, from network 8, the optical waveguides and the communication units indicated with dotted lines in FIG. 11. It is also possible to arrive directly at the topology shown in FIG. 11 by considering, for each interface $I_m$, the number of waveguides either to be introduced or to be stopped according to their type: SWMR, MWSR, SWSR, MWMR . . . .

In network 11, the waveguides $G_k$ are introduced at each interface $I_m$ alternatively in pairs and alone, as will be explained. It should thus be noted that the odd and even interfaces are different. In other words, the odd interfaces are all identical and the even interfaces are also all identical, but different from the odd interfaces. The circuit is thus produced by reusing only two types of layout structure.

Network 11 comprises four interfaces $I_m$ (m=1 . . . 4) of four processing units $P_m$, respectively. Network 11 further comprises a beam F of six optical waveguides $G_k$ (k=1 . . . 6) successively linking the interfaces $I_m$ in a closed loop according to a direction of rotation R.

Each interface $I_m$ comprises six communication units $G_{mn}$ (n=1 . . . 6) each comprising four communication devices represented by circles.

As can be seen in FIG. 11, each waveguide $G_k$ of the beam F starts from the periphery and ends at the interior of the beam F, passing successively through a communication unit $C_{mn}$ of each of the interfaces $I_m$. In this manner, the last communication unit of each waveguide $G_k$ belongs to the interface farthest, in the direction of rotation R, from the starting interface of the waveguide $G_k$.

In addition, a pair of waveguides $G_k$ and an individual waveguide $G_k$ are alternatively introduced at each interface $I_m$ at the periphery of the beam F, so that said waveguide(s) introduced start, respectively, from the most peripheral communication unit(s) $C_{mn}$. The introduction of each waveguide $G_k$ interiorly offsets the waveguides $G_k$ introduced at preceding interfaces. Moreover, the communication units $C_{mn}$ have ranks increasing along the waveguide $G_k$. In the example described, the ranks increase alternatively by one and by two, from one communication unit $C_{mn}$ to the next along the waveguide $G_k$. Furthermore, the interior-most communication units of beam F are end communication units of waveguide $G_k$.

For example, the optical waveguides of the pair $G_1$, $G_2$ pass respectively through the following communication units: $C_{11}$, $C_{12}$ (ranks 1 and 2 of interface $I_1$), $C_{22}$, $C_{23}$ (ranks 2 and 3 of interface $I_2$), $C_{34}$, $C_{35}$ (ranks 4 and 5 of interface $I_3$) and $C_{45}$, $C_{46}$ (ranks 5 and 6 of interface $I_4$).

In reference to FIG. 12, an optical network 12 according to another embodiment of the invention will now be described. Network 12 includes the elements described in reference to FIGS. 1 to 3.

Network 12 comprises four interfaces $I_m$, (m=1 . . . 4) of four processing units $P_m$, respectively. Network 12 further comprises a beam F of twelve optical waveguides $G_k$ (k=1 . . . 12) successively linking the interfaces $I_m$ in a closed loop according to a direction of rotation R.

Each interface $I_m$ comprises six communication units $C_{mn}$ (n=1 . . . 6) each comprising four communication devices represented by arrows.

In network 12, the optical waveguides $G_k$ are of the SWSR (Single Write/Single Read) type. Thus, each optical waveguide $G_k$ links a single writer to a single reader.

With M being the number of interfaces $I_m$, each interface $I_m$ comprises M−1 readers and M−1 writers located at the periphery of the readers. For example, interface $I_1$ comprises, from the periphery to the interior of the beam F: writers $C_{11}$, $C_{12}$, $C_{13}$ and readers $C_{14}$, $C_{15}$, $C_{16}$.

In addition, for each interface $I_m$, each writer of the interface $I_m$ considered is linked by a waveguide $G_k$ to a reader of another interface. This other interface is as far in the direction of rotation R as the writer is peripheral. Moreover, the reader linked to the writer by the waveguide $G_k$ is as peripheral as the writer is peripheral.

For example, writer $C_{13}$ is linked to the reader $C_{22}$ of interface $I_2$, closest to interface $I_1$ in the direction of rotation R. Writer $C_{12}$ is linked to reader $C_{22}$ of interface $I_2$, which follows interface $I_1$. Writer $C_{11}$ is linked to reader $C_{42}$ of interface $I_4$, farthest from interface $I_1$ in the direction of rotation R.

Figure 12:
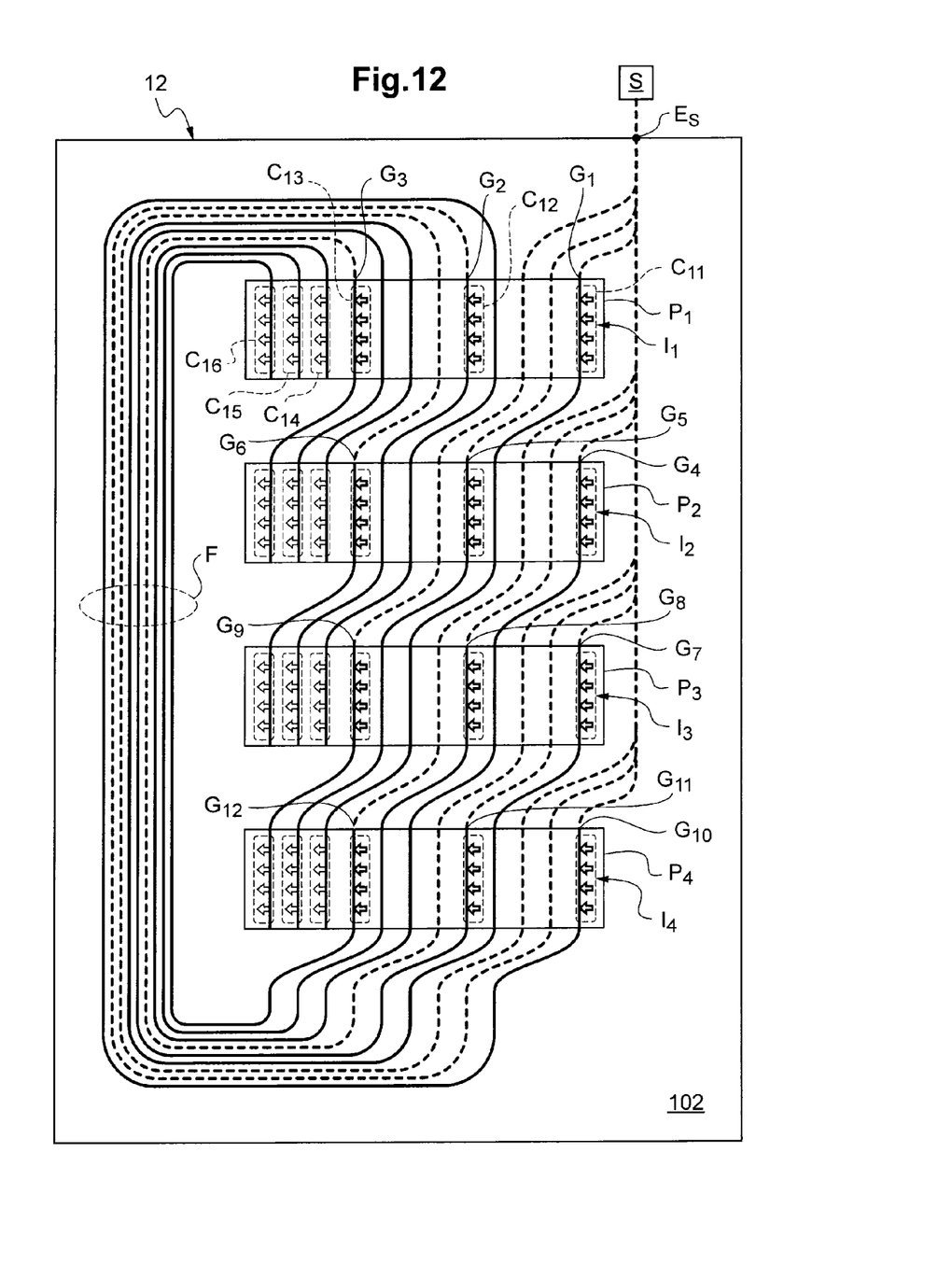

It will be noted that, in the topology shown in FIG. 12, three waveguides are introduced at each interface, one of which is introduced at the periphery of the beam F.

In addition, network 12 comprises an input $E_S$ on medium 102 linked to an optical source S outside the network 12, for example a laser. The input $E_S$ is linked to all of the starting ends of the waveguides $G_k$ by power optical waveguides represented with dotted lines. This connection to the optical source S is performed easily for the waveguides $G_k$ introduced at the periphery of the beam F. For the other waveguides, power waveguides in spiral form and inserted between the waveguides $G_k$ are provided. Although the communication units of each interface $I_m$ are represented as being farther from one another in the presence of an inserted power waveguide (as can be seen, for example, between the writers of each interface), in fact, the minimal spacing between waveguides $G_k$ is often much smaller (between 1 and 5 μm) than the minimal spacing between communication units (typically between 20 and 100 μm when the processing unit $P_m$ is an integrated circuit). Thus, practically speaking, it is possible to transversely tighten the communication units.

In reference to FIG. 13, an optical network 13 according to an embodiment of the invention will now be described. Network 13 includes the elements described in reference to FIGS. 1 to 3.

Network 13 is intended to be used by eight processing units $P_m$ (m=1 . . . 8). Each processing unit $P_m$ has a first interface $I_m$ and a second interface $I'_m$. Processing units $P_1$ to $P_6$ have similar interfaces of a first type (the pair of interfaces $I_m$ and $I'_m$ being identical from one processing unit to another), while processing units $P_7$ and $P_8$ also have similar interfaces, but of a second type (the pair of interfaces $I_m$ and $I'_m$ being identical from one processing unit to another).

Network 13 further comprises two beams F, F' with eight optical waveguides $G_k$ and ten optical waveguides $G'_k$, respectively. The beam F successively links the interfaces $I_m$ in a closed loop according to a direction of rotation R and beam F' surrounds beam F and successively links interfaces $I'_m$ in a closed loop in the same direction of rotation R. Beam F is nested in beam F' so that the interfaces $I'_m$ are at the periphery of the interfaces $I_m$.

All of the optical waveguides $G_k$, $G'_k$ of beams F, F' are introduced at the periphery of their beam F, F'.

More specifically, for beam F, the waveguides are introduced in pairs at the periphery of interfaces $I_2$, $I_3$, $I_4$, $I_5$, $I_6$. However, no waveguide is introduced at interfaces $I_7$ and $I_8$.

For beam F', four waveguides are introduced at the periphery of interface $I'_1$, the other waveguides being introduced individually at the periphery of interfaces $I'_2$, $I'_3$, $I'_4$, $I'_5$, $I'_6$. However, no waveguide is introduced at interfaces $I'_7$ and $I'_8$.

In addition, network 13 comprises an input $E_S$ on the medium 102 linked to an optical source S outside the network 13, for example a laser. The input $E_S$ is linked to all of the starting ends of the optical waveguides $G_k$, $G'_k$ of the two beams F, F' by power optical waveguides represented with dotted lines.

It should be noted that the waveguides $G_k$, $G'_k$ of the two beams F, F', do not cross. The only waveguide crossings occur between the waveguides of beam F' and the power waveguides. Moreover, it is possible to wind the power optical waveguides between the optical waveguides $G_k$, $G'_k$ in order to avoid these crossings.

Beams F, F' may be used to convey different classes of traffic. It should be noted that this cutting into two beams F, F' is a choice motivated by a concern to differentiate different types/natures of communication between the elements of the circuit. In addition, it may be simpler to organize the inter-processing unit exchanges into a plurality of beams when the interfaces, practically speaking, consist of "sub-interfaces" linked to distinct elements of the processing unit (for example, a processor, a memory). The presence of two beams F and F' each linked to the same processing unit, respectively, by two interfaces I and I' makes it possible, practically speaking, to implement two MWSR-type communication types, for example "request" type communications, going from one of several processors to a given memory and "response"-type communications going from one of several memories to a given processor. More specifically, the processing units $P_1$ to $P_6$ each include, for example, a processor and a memory capable, respectively, of being addressed (by sending a request or by returning data read in the memory) to one of the other processing units, respectively by the writers of its associated interface to $I'_6$ and the writers of its associated interface $I_1$ to $I_6$. The processing units $P_7$ to $P_8$ each include, for example, only one memory capable of receiving a read request by the readers of its associated interface $I'_7$ or $I'_8$ and capable of returning data read in the memory intended for another processing unit by the writers of its associated interface $I_7$ or $I_8$.

Each waveguide is, in this example, of the MWSR type. Insofar as, practically speaking, each memory and each processor can generally process only a single read or operation request at a time, the sharing of the optical waveguide is not, practically speaking, actually a factor limiting the speed of operation of the circuit, and the bandwidth through the optical communication network can thus advantageously be reduced, thereby enabling the design of the circuit to be simplified. Thus, it will preferably be chosen to link, to the same optical guide, writers of different associated interfaces with transmitting processing units of which the communications intended for a receiving processing unit are designed to be temporally serialized by the general control system of the electronic circuit including the processing units. Similarly, it will preferably be chosen to link, to the same optical waveguide, readers of different associated interfaces with receiving processing units of which the communications coming from a transmitting processing unit are designed to be temporally serialized by the general control system of the electronic circuit.

Figure 13:
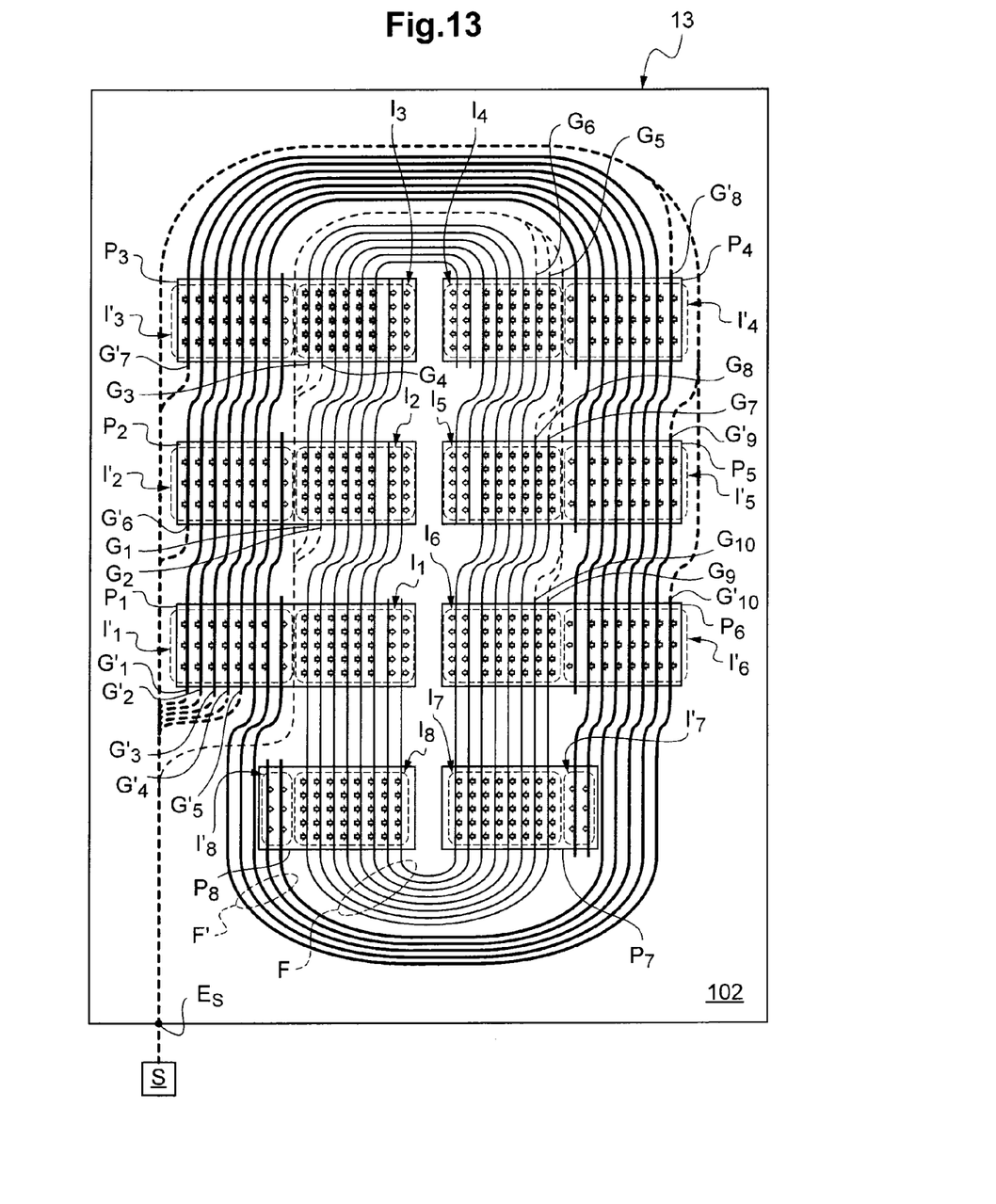

It should be noted that in FIG. 13, two beams F and F', and not just one beam, have been identified. As for the examples described above, each beam groups together the waveguides traveling along, passing through a set of interfaces for which the transmitters are all grouped together and placed at the periphery of the beam and/or the transmitters are all grouped together and placed inside the beam. This grouping of the transmitters on one side and the receivers on the other, with a set of waveguides turning in the same direction of rotation, makes it possible, practically speaking, to maximize the compactness of the optical network. It should be noted, however, that the transmitters could have been placed on the interior side and the receivers on the peripheral side of the beam, with laser sources linked to the waveguides by the interior of the beam.

It should also be noted that the beams F and F' may turn in opposite directions.

In addition, it should be noted as indicated above that the direction of rotation considered corresponds to the direction of propagation of information. If the optical network consists of optical waveguides capable of being passed through by light waves being propagated in opposite directions, the same optical waveguide may possibly be part of two distinct beams, having opposite directions of rotation (of information). It should also be noted that, in the examples presented, the optical waveguides are primarily of the MWSR or SWMR type. Nevertheless, it is possible to have, in the beam, all or some of the guides be of the MWMR type, even though their presence is not generally optimal because this often limits the general bandwidth of the electronic circuit. By contrast, it is also possible to have, in the beam, all or some of the waveguides be of the SWSR type, even though this is not preferred for reasons of bulk. Thus, an optimal compromise is often obtained between the bandwidth and the bulk by using waveguides of the MWSR or SWMR type, by organizing the network on the basis of the analysis of the circuit, by seeking for inter-processing unit communications that necessarily lead to a serialization of the requests received by the receiving processing unit.

It should be noted that each of the optical networks described above is intended to be integrated in a data processing system comprising, in addition to the network itself, where appropriate: the processing units, the clock source and the external optical source.

In addition, in the appended figures, the placement of the different interfaces is given theoretically, and does not necessarily represent their physical placement.

It clearly appears that an optical network as described above makes it possible to interconnect processing units in a simple and effective manner. In particular, the number of waveguides remains moderate and the number of crossings between waveguides remains small. Furthermore, an optical network according to the invention may easily be linked to one or more optical sources, in particular to one or more optical sources outside the network.

It should also be noted that the invention is not limited to the embodiments described above. It will indeed appear to a person skilled in the art that various modifications may be made to the embodiments described above, in light of the teaching disclosed above.

In particular, the invention does not require any presupposition with regard to the interfaces used to link the waveguides.

Moreover, alternatively, the waveguides may be crossed and uncrossed between interfaces. Nevertheless, this possibility is not generally desirable, so that the quality of the beams and information conveyed by these beams through the waveguides is not degraded.

In the claims below, the terms used must not be interpreted as limiting the claims to the embodiments disclosed in the present description, but must be interpreted as including all of the equivalents that the claims are intended to cover due to their wording, and which can be produced by a person skilled in the art applying general knowledge to the teaching disclosed above.

The invention claimed is:

1. An optical network intended to enable communication of data between a plurality of data processing units, comprising:
    a medium;
    at least one beam of a plurality of optical waveguides extending over the medium; and
    a plurality of interfaces associated with each beam and arranged on the medium such that the plurality of interfaces provide communication between the beam and the processing units respectively, each interface comprising:
        a plurality of communication units associated with respective optical waveguides of the beam so as to enable the respective processing unit to exchange data with said respective optical waveguide, each communication unit being capable of being a reader and/or a writer, wherein the beam successively links the plurality of interfaces in a closed loop oriented in a certain direction of rotation of information;
    wherein the plurality of communication units of each interface are transversely arranged and designated in spatial ranks increasing from the periphery position of the beam to the interior position of the beam;
    wherein the beam includes first and second optical waveguides which start from different interfaces or end at different interfaces;
    wherein the first optical waveguide links a communication unit of a first interface having a first spatial rank to a communication unit of a second interface having a different spatial rank;
    and
    wherein the second optical waveguide passes through the communication unit of the second interface of lower spatial rank than the spatial rank of the communication unit of this second interface through which the first optical waveguide passes.

2. The optical network according to claim 1, wherein, for each beam, at least two interfaces include the same number of writers and readers as each other, transversely arranged in the same manner, and wherein the writers are all placed at the periphery of the beam and the readers are placed at the interior of the beam, or the reverse.

3. The optical network according to claim 1, wherein each of said plurality of optical waveguides of the beam starts or ends:
    either from/at the most peripheral communication unit of one of the interfaces with the beam;
    or from/at another communication unit of the interface, at the periphery of which are only communication units from/at which, respectively, other optical waveguides start or end.

4. The optical network according to claim 1, wherein each of said plurality of optical waveguides ends or starts:
    either at/from the interior-most communication unit of one of the interfaces;
    or at/from another communication unit of the interface, at the interior of which are only communication units where, respectively, other optical waveguides end or start.

5. The optical network according to claim 1, wherein at least one optical waveguide passes successively through a communication unit of each of the interfaces, the communication units all being writers except for the last which is a reader.

6. The optical network according to claim 1, wherein at least one optical waveguide passes successively through a communication unit of each of the interfaces, the communication units all being readers except for the first which is a writer.

7. The optical network according to claim 1, wherein at least one optical waveguide links a single writer to a single reader.

8. The optical network according to claim 1, further comprising, for at least one optical waveguide, an optical source extending over the medium, said optical source being specific to said optical waveguide and linked to a starting end of the optical waveguide.

9. The optical network according to claim 1, comprising an input on the medium intended to be linked to an optical source outside the optical network, said input being linked to the starting end of at least one optical waveguide.

10. The optical network according to claim 1, comprising two beams nested one in the other.

11. The optical network according to claim 1, wherein the optical waveguides of the same beam do not cross.

12. A system for data processing, including:
    data processing units; and
    an optical network according to claim 1, intended to enable communication of data between the data processing units.

13. The optical network according to claim 1, wherein each of at least one optical waveguide links, in the direction of rotation of information, communication units arranged increasingly close to the interior of the beam in their respective interfaces, or arranged increasingly close to the periphery of the beam in their respective interfaces.

14. The optical network according to claim 1, wherein the optical waveguides of each beam extend over the medium in a form of a spiral, each of the optical waveguides forming an arm of the spiral.

15. The optical network according to claim 1, wherein the two communication units linked by the first optical waveguide are both readers and/or writers.

16. An optical network intended to enable communication of data between data processing units, including:
    a medium;
    at least one beam of a plurality of optical waveguides extending over the medium; and for each beam, interfaces between the beam and the processing units respectively, each interface comprising one or more communication units with, respectively, one or more optical waveguides of the beam so as to enable the respective processing unit to exchange data with said optical waveguide(s), each communication unit being capable of being a reader and/or a writer, wherein the beam successively links the interfaces in a closed loop oriented in a certain direction of rotation of information;

wherein the communication units of each interface are transversely arranged in ranks increasing from the periphery to the interior of the beam;

wherein first and second optical waveguides start from different interfaces or end at different interfaces;

wherein the first optical waveguide links two communication units both readers and/or writers and of different ranks in respective first and second interfaces; and wherein the second optical waveguide passes through a communication on unit of the second interface of lower rank than that of the communication unit of this second interface through which the first optical waveguide passes; and wherein each of at last one optical waveguide links, in the direction of rotation of information, communication units arranged increasingly close to the interior of the beam in their respective interfaces, or arranged increasingly close to the periphery of the beam in their respective interfaces.

17. An optical network intended to enable communication of data between data processing units, including:

a medium;

at least one beam of a plurality of optical waveguides extending over the medium; and for each beam, interfaces between the beam and the processing units respectively, each interface comprising one or more communication units with, respectively, one or more optical waveguides of the beam so as to enable the respective processing unit to exchange data with said optical waveguide(s), each communication unit being capable of being a reader and/or a writer, wherein the beam successively links the interfaces in a closed loop oriented in a certain direction of rotation of information;

wherein the communication units of each interface are transversely arranged in ranks increasing from the periphery to the interior of the beam;

wherein first and second optical waveguides start from different interfaces or end at different interfaces;

wherein the first optical waveguide links two communication units both readers and/or writers and of different ranks in respective first and second interfaces;

wherein the second optical waveguide passes through a communication unit of the second interface of lower rank than that of the communication unit of this second interface through which the first optical waveguide passes; and wherein the optical waveguides of each beam extend over the medium in a form of a spiral, each of the optical waveguides forming an arm of the spiral.

* * * * *